(12) United States Patent
Chamberlin et al.

(10) Patent No.: US 7,694,909 B1
(45) Date of Patent: Apr. 13, 2010

(54) METHOD OF WINDING A FLEXIBLE CORE

(75) Inventors: Bradley D. Chamberlin, Pendleton, IN (US); Mark A. Stephenson, Fairland, IN (US); Larry A. Kubes, Climax, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/478,879

(22) Filed: Jun. 5, 2009

(51) Int. Cl.
*B65H 54/64* (2006.01)
*H02K 15/085* (2006.01)
*H02K 15/09* (2006.01)

(52) U.S. Cl. ............... 242/436; 242/433; 242/433.4; 242/432; 242/437

(58) Field of Classification Search ............. 242/433, 242/433.1–433.4, 436, 437, 432, 432.6
See application file for complete search history.

(56) References Cited

U.S. PATENT DOCUMENTS

| | | | |
|---|---|---|---|
| 6,530,140 B2 | 3/2003 | Maeda et al. | |
| 6,553,650 B2 | 4/2003 | Nakamura et al. | |
| 6,712,307 B2 * | 3/2004 | Iwase et al. | 242/433 |
| 6,865,796 B1 | 3/2005 | Oohashi et al. | |
| 7,004,420 B2 | 2/2006 | Stratico et al. | |
| 7,159,816 B2 | 1/2007 | Sweeney et al. | |
| 7,213,784 B2 * | 5/2007 | Lundahl | 242/610.2 |
| 7,243,873 B2 | 7/2007 | Noji | |
| 7,543,774 B2 * | 6/2009 | Stroebel et al. | 242/433.4 |
| 2003/0089812 A1 * | 5/2003 | Iwase et al. | 242/433 |
| 2004/0173710 A1 * | 9/2004 | Stratico et al. | 242/432 |
| 2005/0029385 A1 | 2/2005 | Stratico et al. | 242/432.2 |
| 2005/0133655 A1 * | 6/2005 | Hashimoto et al. | 242/433 |
| 2005/0247815 A1 | 11/2005 | Sweeney et al. | |
| 2006/0169822 A1 * | 8/2006 | Noji | 242/432.2 |
| 2006/0273214 A1 * | 12/2006 | Stratico et al. | 242/432 |
| 2007/0181732 A1 * | 8/2007 | Noji | 242/432.2 |
| 2008/0203213 A1 * | 8/2008 | Noji | 242/433.1 |
| 2009/0057473 A1 * | 3/2009 | Ujiie | 242/433.3 |
| 2009/0065623 A1 | 3/2009 | Touzet | |

* cited by examiner

*Primary Examiner*—Evan H Langdon
(74) *Attorney, Agent, or Firm*—Cantor Colburn LLP

(57) ABSTRACT

A method of winding a flexible core includes forming a flexible core member having a first end portion, a second end portion and a plurality of teeth each having a central axis with the plurality of teeth being arranged in a substantially linear array. The method also includes manipulating the flexible core member into an inverted core form having an outer portion and an inner portion with the plurality of teeth extending out from the outer portion away from the inner portion, positioning a winding member including an amount of wire adjacent one of the plurality of teeth, and rotating the flexible core member about the central axis of the one of the plurality of teeth. The method further includes applying wraps of the wire to the one of the plurality of teeth.

16 Claims, 3 Drawing Sheets

METHOD OF WINDING A FLEXIBLE CORE

BACKGROUND OF THE INVENTION

The subject matter disclosed herein relates to the art of electric machines having flexible cores and, more particularly, to a method of winding a flexible core of an electric machine.

At present, stator cores are wound with round wire. The stator core is held stationary and the round wire is fed through a winding member that is rotated about a stator tooth. Once the stator tooth is wound, the wire is advanced to a subsequent stator tooth. At each tooth, the winding member not only travels along a circular path but also moves in and out to layer the wire. Upon exiting the winding member, the wire twists as a result of the rotation created while traveling along the circular path.

BRIEF DESCRIPTION OF THE INVENTION

According to one aspect of the invention, a method of winding a flexible core includes forming a flexible core member having a first end portion, a second end portion and a plurality of teeth each having a central axis with the plurality of stator teeth being arranged in a substantially linear array. The method also includes manipulating the flexible core member into an inverted core form having an outer portion and an inner portion with the plurality of teeth extending out from the outer portion away from the inner portion, positioning a winding member including an amount of wire adjacent one of the plurality of teeth, and rotating the flexible core member about the central axis of the one of the plurality of teeth. The method further includes applying a number of wraps of the wire to the one of the plurality of teeth with the number of wraps including a number of twists that is fewer than the number of wraps.

BRIEF DESCRIPTION OF THE DRAWINGS

The above, as well as other advantages of the present invention, will become readily apparent to those skilled in the art from the following detailed description when considered in light of the accompanying drawings in which.

The detailed description explains embodiments of the invention, together with advantages and features, by way of example with reference to the drawings.

DETAILED DESCRIPTION OF THE INVENTION

Figure 1:
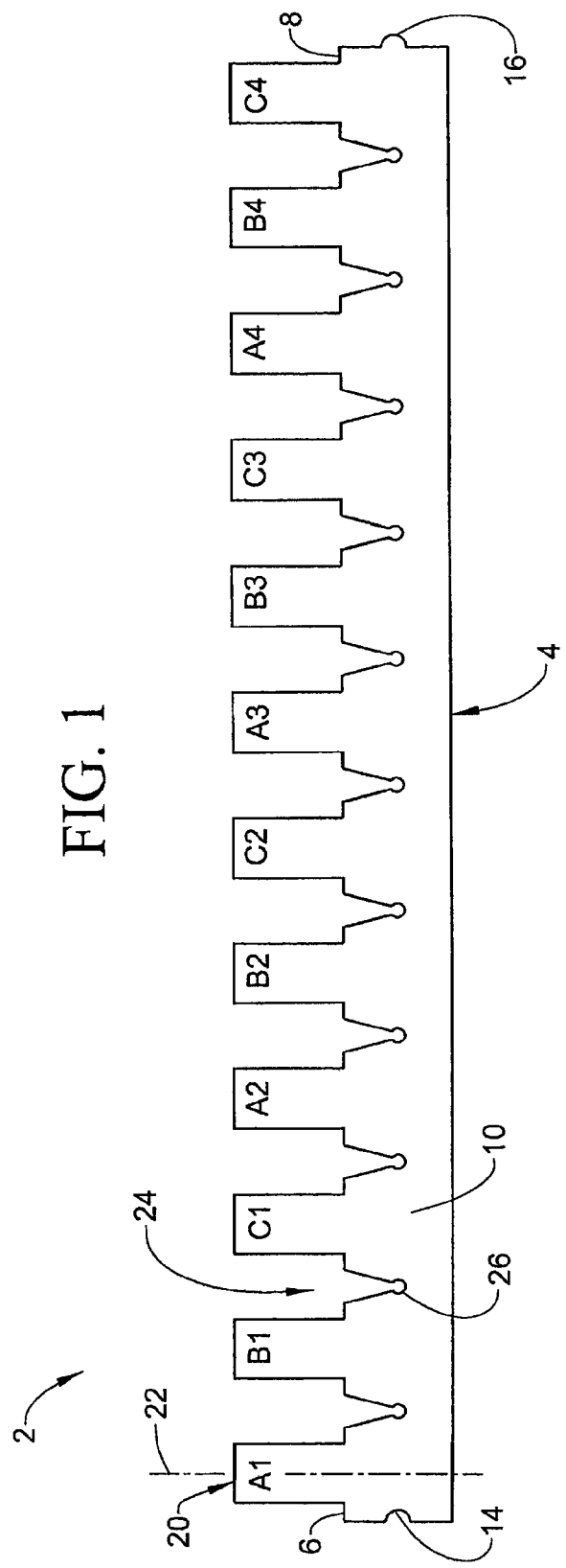
FIG. 1 is an elevational view of a flexible core member constructed in accordance with an exemplary embodiment.

With reference to FIG. 1, a flexible core member, shown in the form of a flexible stator core constructed in accordance with an exemplary embodiment is indicated generally at 2. Flexible core member 2 includes a main body 4 having a first end portion 6 that extends to a second end portion 8 through an intermediate portion 10. As shown, first end portion 6 includes a key member 14 while second end portion 8 includes a key element 16. Key member 14 is configured to engage with key element 16 when first end portion 6 is connected to second end portion 8, as will described more fully below.

As further shown in FIG. 1, flexible core member 2 includes a plurality of stator teeth, one of which is indicated at 20. Stator teeth 20 are arranged in a plurality of poles such as shown at $A_1$-$A_4$; $B_1$-$B_4$; and $C_1$-$C_4$. Each of the plurality of stator teeth 20 includes a central axis 22. In addition, flexible core member 2 includes a plurality of flex points 24 arranged between each of the plurality of stator teeth 20. Each flex point 24 includes a stress relief member 26 that is configured to prevent breakage in intermediate portion 10 when flexible core member 2 is manipulated in the manner that will be described more fully below.

Figure 2:
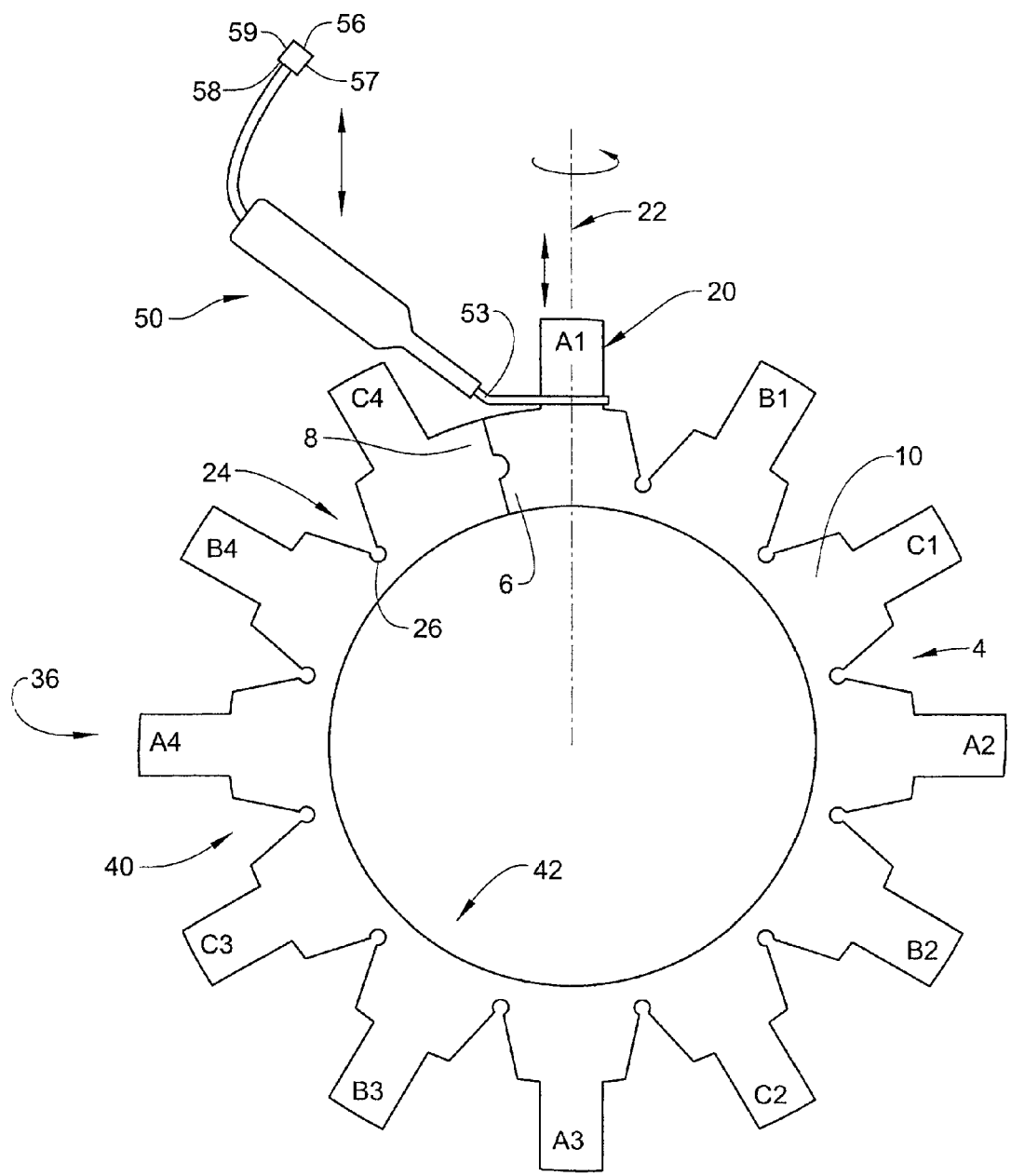
FIG. 2 is an elevational view of the flexible core member of FIG. 1 bent into an inverted core form for application of a continuous, uninterrupted untwisted length of rectangular wire.

Reference will now be made to FIG. 2 describing a method in which flexible core member 2 is wrapped with wire. As shown, flexible core member 2 is initially formed into an inverted core form 36 having an outer diameter portion 40 and an inner diameter portion 42. Of course it should be understood that inverted core form 36 can take on a variety of geometric shapes that provide access to the plurality of stator teeth 20. That is, the plurality of stator teeth 20 project outward from outer diameter portion 40 away from inner diameter portion 42. At this point, inverted core form 36 is moved adjacent to a winding member shown in the form of a winding needle 50 that is provided with a length of wire 53 which, in accordance with the exemplary embodiment, includes a plurality of sides 56-59 so as to collectively form a rectangular cross-section. Once in place, inverted core form 36 is rotated about central axis 22 in order apply wraps of wire 53 to one of the plurality of stator teeth 20. In accordance with another aspect, winding needle 50 is rotated about the one of the plurality of stator teeth 20.

In accordance with another aspect, both inverted core form 36 and winding needle 50 are rotated to apply wraps of wire to the one of the plurality of stator teeth. That is, the one of the plurality of stator teeth 20 is wrapped with a number of wraps of wire, with the wire having fewer twists than the total number of wraps. In accordance with one aspect of the invention, the number of twists will be one fewer than the total number of wraps. In accordance with another aspect of the invention, the number of twists will be between one fewer and half the total number of wraps. In accordance with yet another aspect, the number of twists will be fewer than half of the total number of wraps. In accordance with still another aspect of the invention, the wire will remain untwisted.

In addition to rotation about axis 22, inverted core form 36 oscillates about a substantially linear path defined by axis 22 in order to layer wire 53 onto the one of the plurality of stator teeth 20. Of course, it should be understood that winding needle 50 could also be oscillated along the substantially linear path in order to layer wire 53. In any event, once the one of the plurality of stator teeth 20 is wrapped with an appropriate number of wraps of wire, inverted core form 36 is rotated to another one of the plurality of stator teeth 20, such as tooth A2. At this point, inverted core form 36 is again rotated about the central axis of tooth A2 in order to apply wraps of wire 53.

Figure 3:
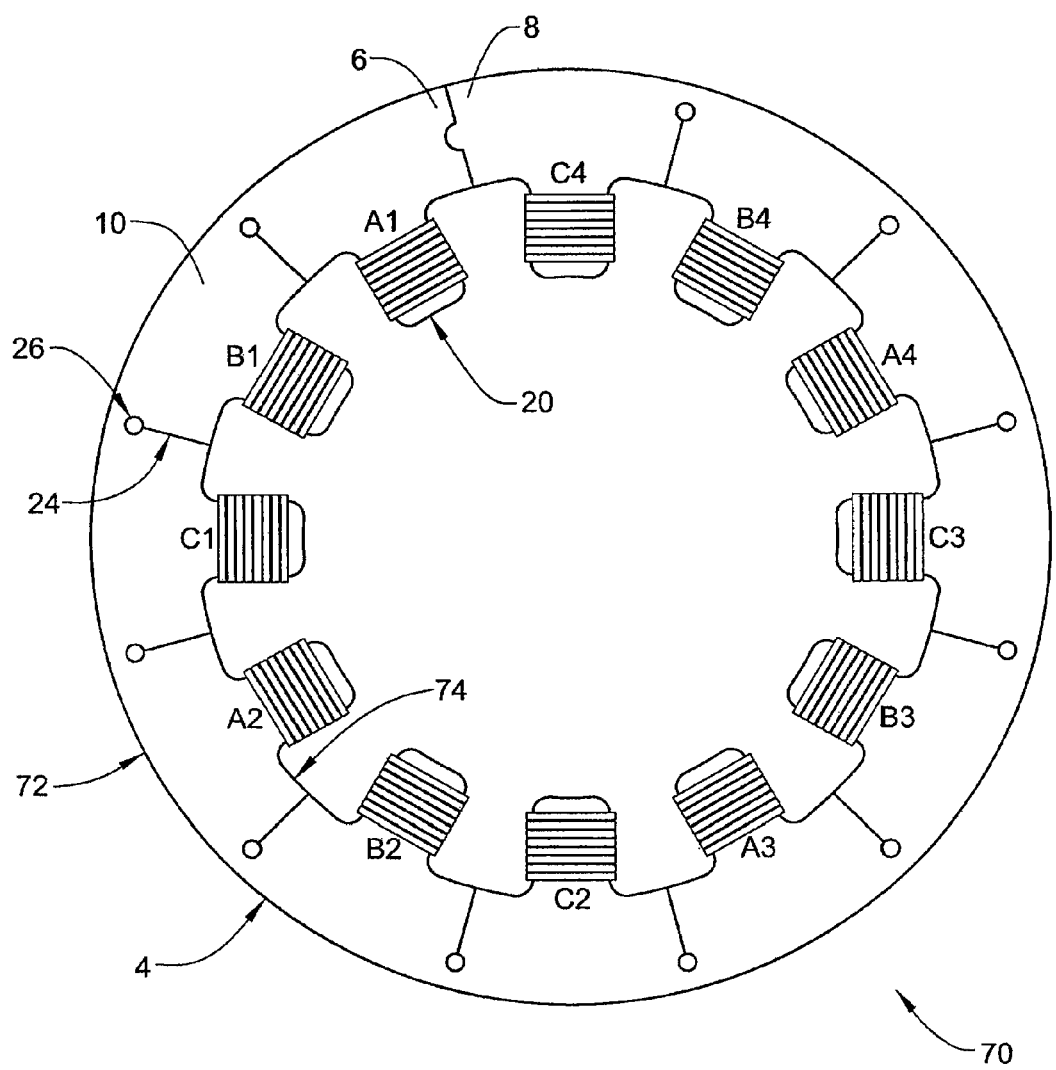
FIG. 3 is an elevational view of the flexible core member of FIG. 1 bent into a final core form following application of the continuous uninterrupted untwisted length of rectangular wire.

Once each of the plurality of stator teeth 20 are wrapped with an appropriate amount of wire, inverted core form 36 is reformed into a final core form 70 such as indicated in FIG. 3. With this arrangement, first end portion 6 is joined with second end portion 8 such that key member 14 registers with key element 16. First and second end portions 6 and 8 are then joined through, for example, a welding process. In any event, final core form 70 includes an outer diameter portion 72 and an inner diameter portion 74. With this arrangement, the plurality of stator teeth 20 project inward from inner diameter portion 72 toward a central portion of final core form 70.

At this point, it should be understood that the exemplary embodiments enable a stator core to be wound with a continuous, uninterrupted and untwisted length of rectangular wire. In this manner, rectangular wire, is applied to each of the plurality of stator teeth in order to minimize an overall form factor of the stator core. More specifically, instead of using a twisted, round wire that generates bulk when applied to a stator tooth, continuous, untwisted rectangular wire maintains a substantially small footprint so that an overall form factor of the stator core is reduced allowing for the construction smaller, more compact electric machines. Also, while described in connection with a flexible stator core, it should be understood that the exemplary embodiment can also be employed to wind other types of flexible cores be they rotating cores or stationary cores. In addition, it should be understood that while the winding member is describes as a winding needle, various other devices that feed wire can be also employed.

While embodiments of the invention have been described above, it will be understood that those skilled in the art, both now and in the future, may make various improvements and enhancements which fall within the scope of the claims which follow. These claims should be construed to maintain the proper protection for the invention first described.

The invention claimed is:

1. A method of winding a flexible core, the method comprising:
   forming a flexible core member having a first end portion, a second end portion and a plurality of teeth each having a central axis, the plurality of teeth being arranged in a substantially linear array;
   manipulating the flexible core member into an inverted core form having an outer portion and an inner portion, the plurality of teeth extending out from the outer portion away from the inner portion;
   positioning a winding member including an amount of wire adjacent one of the plurality of teeth;
   rotating one of the flexible core member and the winding member about the central axis of the one of the plurality of teeth; and
   applying a number of wraps of the wire to the one of the plurality of teeth, the number of wraps including a number of twists that is fewer than the number of wraps.

2. The method of claim 1, further comprising: oscillating at least one of the flexible core member and the winding member along a substantially linear path defined by the central axis of the one of the plurality of teeth.

3. The method of claim 1, further comprising: shifting one of the flexible core member and the winding member to position another one of the plurality of teeth proximate to the winding member.

4. The method of claim 3, further comprising:
   rotating one of the flexible core member and the winding member about the central axis of the another one of the plurality of teeth; and
   applying a number of wraps of the wire to the another one of the plurality of teeth, the number of wraps including a number of twists that is fewer than the number of wraps.

5. The method of claim 1, further comprising: manipulating the flexible core member into a final core form, the final core form having an outer diametric portion and an inner diametric portion, the plurality of teeth extending in towards the inner diametric portion.

6. The method of claim 5, further comprising: joining the first and second end portions of the flexible core member.

7. The method of claim 1, wherein forming the flexible core member includes creating a plurality of flex points in the flexible stator core member, each of the plurality of flex points being arranged adjacent to a corresponding one of the plurality of teeth.

8. The method of claim 7, wherein creating the plurality of flex points in the flexible core member includes forming a stress relief member at each of the plurality of flex points.

9. The method of claim 1, wherein applying the wire to the one of the plurality of teeth includes wrapping wire having a plurality of sides that define a rectangular cross-section around the one of the plurality of teeth.

10. The method of claim 9, wherein wrapping the wire includes positioning the wire on the one of the plurality of teeth such that only one of the plurality of sides faces the one of the plurality of teeth.

11. The method of claim 1, further comprising: applying the wraps of wire to each of the plurality of teeth without creating a discontinuity in the wire.

12. The method of claim 1, further comprising: applying the wraps of wire to each of the plurality of teeth without creating a twist in the wire.

13. The method of claim 1, wherein the number of twists is one fewer than the number of wraps.

14. The method of claim 13, wherein the number of twists is between one fewer than the number of wraps and half the number of wraps.

15. The method of claim 14, wherein the number of twists is fewer than half the number of wraps.

16. The method of claim 15, wherein there are no twists in the wire.

* * * * *